United States Patent
Dorlac

[19]

[11] Patent Number: 6,099,732
[45] Date of Patent: Aug. 8, 2000

[54] SOLVENT EXTRACTION METHOD AND APPARATUS

[76] Inventor: Jerome P. Dorlac, 1115 W. San Lucas Cir., Tucson, Ariz. 85704

[21] Appl. No.: 09/294,109

[22] Filed: Apr. 19, 1999

[51] Int. Cl.[7] .................................................. B01D 11/04
[52] U.S. Cl. ......................... 210/634; 210/638; 210/511
[58] Field of Search .................................. 210/634, 638, 210/639, 511; 422/256, 259

[56] References Cited

U.S. PATENT DOCUMENTS

| | | | |
|---|---|---|---|
| 2,667,407 | 1/1954 | Fenske | 210/634 |
| 2,710,250 | 6/1955 | Andrews | 210/634 |
| 3,449,244 | 6/1969 | Clay | 210/634 |
| 3,661,564 | 5/1972 | Gandon et al. | 75/365 |
| 3,752,758 | 8/1973 | Hindi | 210/634 |
| 4,012,481 | 3/1977 | Baltz et al. | 423/22 |
| 4,097,271 | 6/1978 | Swinkels et al. | 75/718 |
| 4,126,551 | 11/1978 | Cognevich | 210/634 |
| 4,188,290 | 2/1980 | Graham | 210/634 |
| 4,268,484 | 5/1981 | Gavin | 422/259 |
| 4,338,285 | 7/1982 | Eberts | 422/287 |
| 4,441,993 | 4/1984 | Howald | 209/5 |
| 4,545,901 | 10/1985 | Schneider | 210/634 |
| 4,587,106 | 5/1986 | Bauer | 210/634 |
| 4,623,466 | 11/1986 | Savall | 210/634 |
| 4,647,438 | 3/1987 | Sabot et al. | 423/21.5 |
| 4,747,948 | 5/1988 | North | 210/634 |
| 4,921,612 | 5/1990 | Sirkar | 210/634 |
| 4,954,260 | 9/1990 | Ludmer | 210/634 |
| 5,433,855 | 7/1995 | Campbell et al. | 210/638 |
| 5,447,552 | 9/1995 | Mihaylov et al. | 75/722 |
| 5,470,552 | 11/1995 | Kordosky et al. | 423/137 |
| 5,522,997 | 6/1996 | Virnig et al. | 210/638 |
| 5,772,890 | 6/1998 | Hubred | 210/634 |

FOREIGN PATENT DOCUMENTS

| | | | |
|---|---|---|---|
| 534807 | 12/1956 | Canada | 210/634 |
| 1095172 | 9/1980 | Canada | 210/634 |
| 1231072 | 1/1988 | Canada | 210/634 |

*Primary Examiner*—Ernest G. Therkorn
*Attorney, Agent, or Firm*—Elbie R. de Kock

[57] ABSTRACT

A method of solvent extraction for extracting a required component, such as a metal value, dissolved or dispersed in a support medium, constituting a first phase, e.g. an aqueous phase, by mixing the first phase with an extractant, constituting a second phase, e.g. an organic phase, insoluble or immiscible with the first phase. The second phase has a greater affinity for the required component in order to extract the component from the first phase into the second phase. After the mixing step, the phases are subjected to a settling phase in which the phases are caused to flow in counter-current fashion with respect to each other in order to separate the phases. Apparatus for carrying out the method is also provided.

5 Claims, 4 Drawing Sheets

26,099,732

SOLVENT EXTRACTION METHOD AND APPARATUS

FIELD OF THE INVENTION

This invention relates to a method of solvent extraction and apparatus for carrying out the method.

BACKGROUND OF THE INVENTION

Solvent extraction is used inter alia for removing selected metals from aqueous solution. The process typically comprises two stages, extraction of the metal values from aqueous solution by an organic extractant and stripping of the metal values from the metal loaded organic extractant by an aqueous stripping solution. In the extraction and stripping stages, each stage consists of a mixer (or series of mixers) and a settler, where metal exchange from one phase to the other takes place. The number of extraction and strip stages required to recover a desired metal value can be determined by metallurgical testing of the solutions in question. The mixer-settler of each stage consists of a mixer (or mixers) section and a settler section. In the mixer section, the aqueous solution containing the metal value is mixed with an organic extractant which selectively combines with the metal to be extracted. During an extraction stage the aqueous solution and organic are mixed to form an emulsion to provide as much as possible contact between the organic and aqueous phases to maximise extraction of the metal into the organic phase. In a stripping mixing stage, the metal value is re-extracted from the organic phase by the aqueous stripping solution. When an emulsion from either the extraction or strip stage enters its settler section, the emulsion from the mixer is introduced into the settler where the organic and aqueous phases are allowed to separate with the organic forming a layer above the aqueous phase. The two phases are in constant flow in the settler. Separate overflows for the organic and aqueous phases are provided at one end of the settler so that the organic is retrieved for subsequent treatment in the next stage of extraction or stripping. The exiting aqueous solution also reports to its subsequent destination in the process. Typically, both the organic and the aqueous phases flow in the same direction in the settler, i.e. there is co-current flow in the settler.

A problem with the above conventional arrangement is that impurities present in the aqueous solution, referred to as "crud" form a layer between the organic and aqueous layers in the settler and a so- called "crud-run" is experienced when the crud accumulates at the organic overflow and exits with the organic, which causes problems.

It is accordingly an object of the present invention to alleviate the abovementioned difficulty.

SUMMARY OF THE INVENTION

According to the invention there is provided a method of solvent extraction for extracting a required component dissolved or dispersed in a support medium, constituting a first phase, by mixing said first phase with an extractant, constituting a second phase insoluble or immiscible with said first phase, said second phase having a greater affinity for said required component in order to extract said component from said first phase into said second phase and, after said mixing, subjecting said phases to a settling phase wherein said phases are caused to flow in counter- current fashion with respect to each other in order to separate the phases.

The settling phase may comprise a pre-settling phase, in which there is an initial separation of the phases, and a subsequent main settling phase in order to complete the separation of the phases.

Also according to the invention there is provided solvent extraction apparatus comprising a settling chamber having an inlet for an emulsion of first and second immiscible phases, means inside the chamber for inducing flow of said first and second phases in mutually opposite directions and having first and second outlets on opposite sides of said inlet for respectively discharging said first and second phases from said chamber.

The settling chamber may comprise a pre- settling chamber having said inlet for the emulsion, for initial separation of said phases, and a main settling chamber having first and second inlets at opposite sides thereof, for receiving said initially separated first and second phases, respectively, and first phase and second phase outlets for discharging the separated phases from said main settling chamber.

Further objects and advantages of the invention will become apparent from the description of preferred embodiments of the invention below.

BRIEF DESCRIPTION OF THE DRAWINGS

The invention will now be described, by way of example, with reference to the accompanying drawings, in which.

DETAILED DESCRIPTION OF PREFERRED EMBODIMENT

Figure 2:
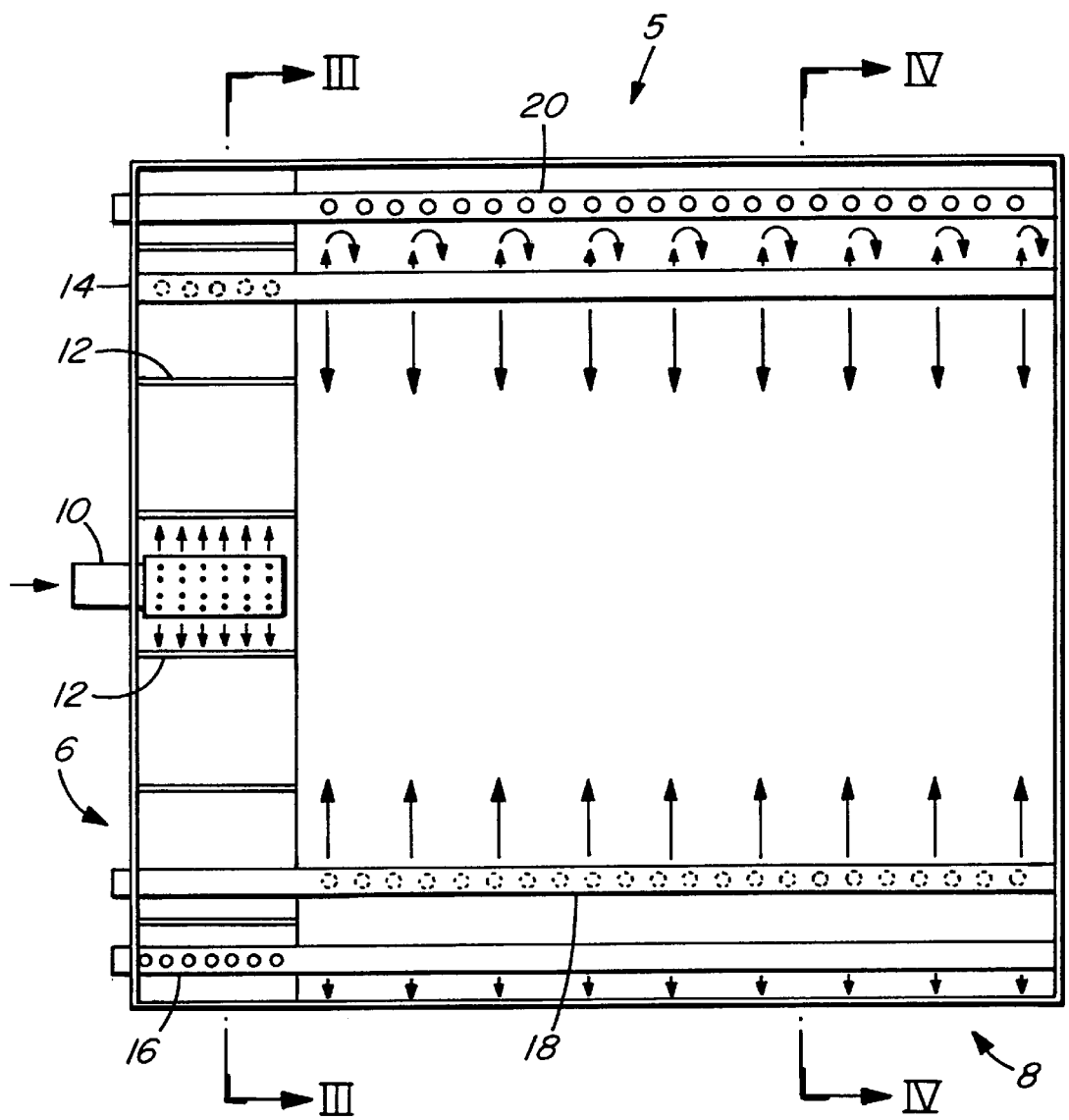
FIG. 2 is a plan view of a settler comprising a pre-settling compartment and a main settling chamber.

In FIG. 2, reference numeral 5 generally indicates a settler comprising two sections, namely a pre-settling compartment or emulsion chamber 6, where the emulsion from the mixer (not shown) is centrally introduced, as indicated at 10, and a main settling chamber 8.

Figure 3:
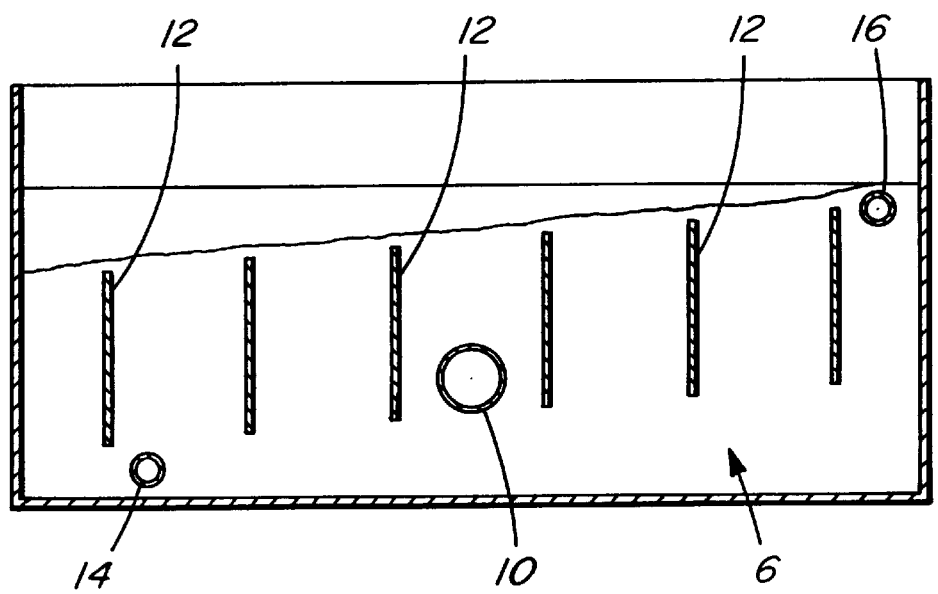
FIG. 3 is a section taken along the lines III—III in FIG. 2.

A number of baffles 12 extending across the flow path of the emulsion in the compartment 6 are provided. During the flow there is an initial separation of the organic and aqueous phases, assisted by the baffles 12, with the organic phase forming a layer above the aqueous phase (FIG. 3). Aqueous phase along with some emulsion exits the pre-settling compartment 6 through a pipe 14 and clear organic and some emulsion exits through a pipe 16. The pipes 14 and 16 are located at the opposite ends of the compartment 6, the organic receiving pipe 16 being located at a higher level than the aqueous phase receiving pipe 14. The baffles 12 are located at generally increasing height towards the organic receiving pipe 16, which facilitates the initial separation of the phases.

The aqueous phase plus emulsion exits from the pipe 14 and the organic phase plus some emulsion exits from the pipe 16 into the main settling chamber 18.

Figure 4:
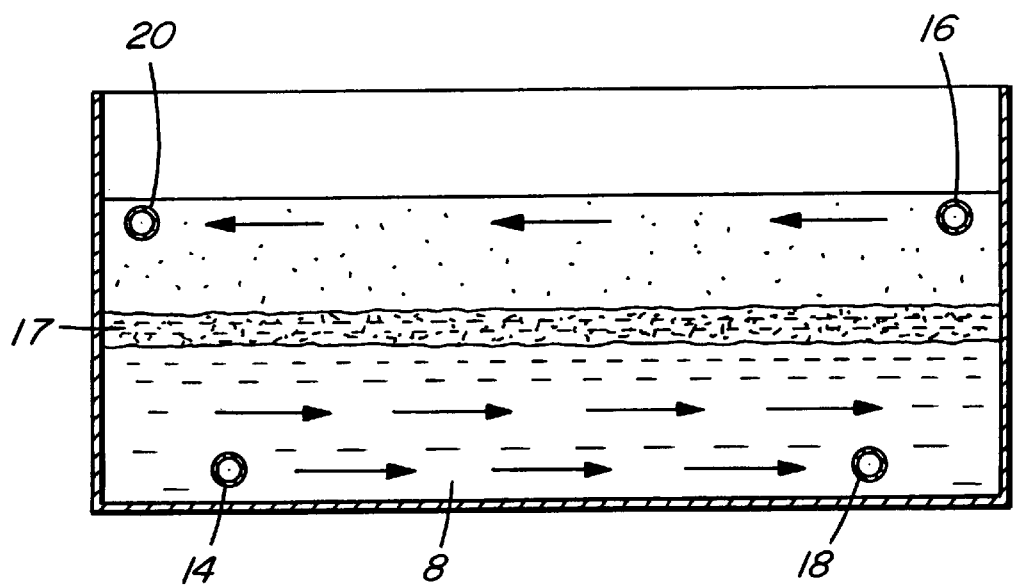
FIG. 4 is a section taken along the lines IV—IV in FIG. 2.

An aqueous outlet pipe 18 and an organic outlet pipe 20 are provided for receiving the separated aqueous and organic phases exiting the settler 5 (FIGS. 2 and 4). An aqueous level control is provided which is located outside the settling chamber 8, or the aqueous phase exiting the settler can exit via a conventional underflow/adjustable overflow weir level control. Also the organic phase can exist via a conventional organic overflow weir to an organic trough (see FIG. 1). However, the organic exit will be at the opposite end of the settler from the aqueous exit, as in FIG. 2.

Figure 1:
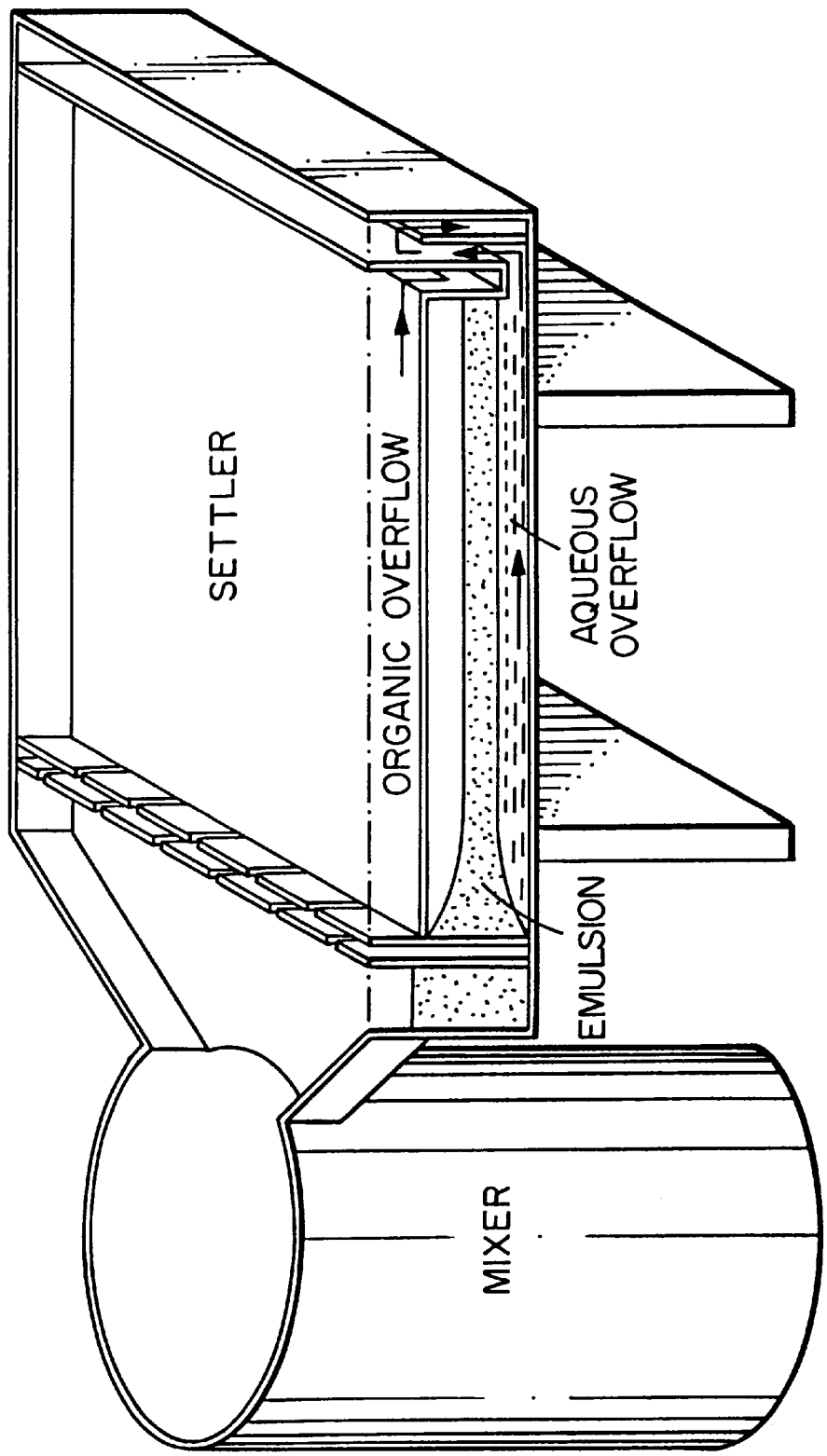
FIG. 1 is a perspective view of a conventional mixer/settler design.

As shown in FIG. 4, the flow of the organic and aqueous layers are in opposite directions in the main settling chamber 8, i.e. counter-current flow, as opposed to the co-current flow of the conventional settlers, as shown in FIG. 1. There is an aqueous/organic interface 17 between the organic and aqueous layers.

In operation of the settler 5, it is observed that most of the crud-like material advances towards the aqueous outlet 18 which results in much of this crud-like material being discharged with the aqueous phase. At the organic outlet 20, the organic leaving the settler 5 exhibits much less crud than observed in a co-current system. Also the crud at this outlet has been observed to report to the aqueous/organic interface 17, where easier removal methods can be used to remove this portion of crud from the settler 5, without creating a crud overflow via the organic outlet 20.

In an alternative embodiment, the pre-settling compartment 6 may be omitted.

Figure 5:
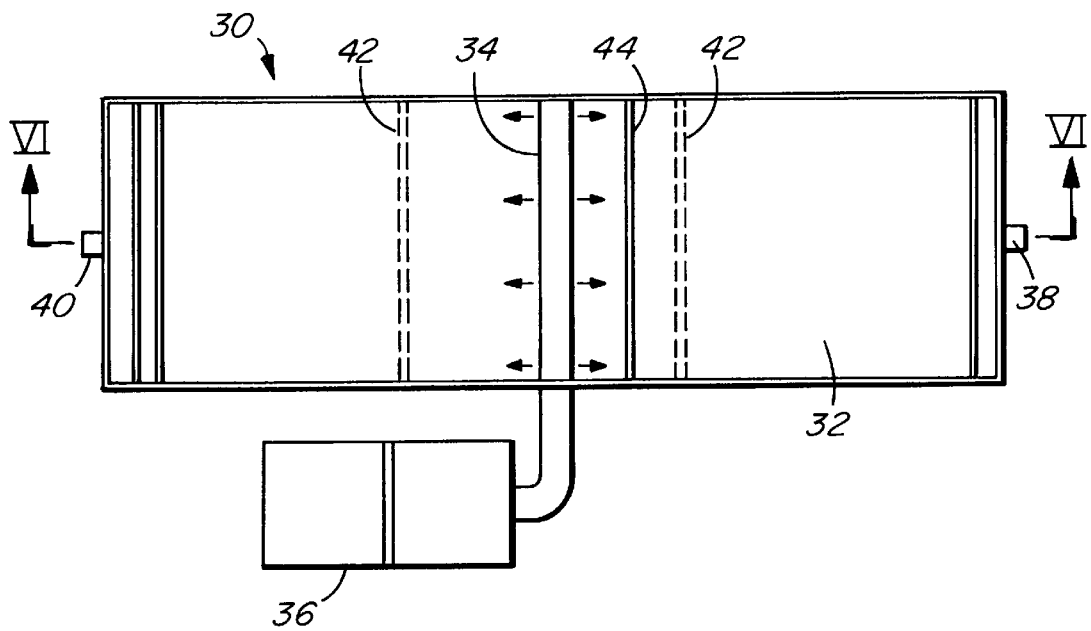
FIG. 5 is a plan view of a settler without a pre-settling compartment.
Figure 6:
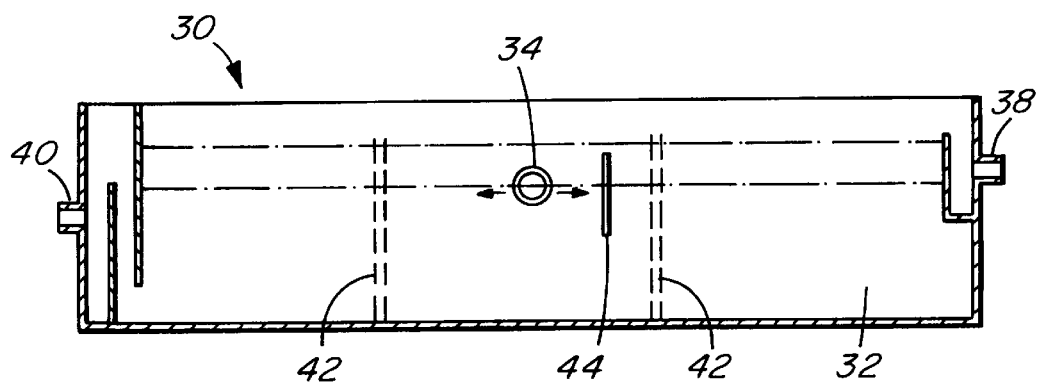
FIG. 6 is a section taken along the lines VI—VI in FIG. 5.

In FIGS. 5 and 6, reference numeral 30 generally indicates a settler comprising an elongate settling chamber 32 provided with an inlet pipe 34 for introducing an aqueous/organic emulsion received from a mixer 36. For this purpose, the pipe 34 is provided with two rows of openings on opposite sides thereof as indicated by the arrows. The settling chamber 32 has an organic outlet 38 and an aqueous outlet 40. The chamber 32 is further provided with picket fences 42, to promote laminar flow, and a baffle 44.

In operation, the emulsion enters through the inlet 34 and separation of the phases takes place as the organic phase, forming the upper layer, flows in one direction and the aqueous phase flows in the opposite direction. This separation is assisted by the baffle 44. The inlet 34 may either be located centrally in the settling chamber 32, as shown in FIGS. 5 and 6, or it may be located closer to either the organic or aqueous outlet end, depending on which departing phase is required with the least entrainment of the other phase.

While only preferred embodiments of the invention have been described herein in detail, the invention is not limited thereby and modifications can be made within the scope of the attached claims.

What is claimed is:

1. A method of solvent extraction for extracting a required component dissolved or dispersed in a support medium, constituting a first phase, by mixing said first phase with an extractant, constituting a second phase insoluble or immiscible with said first phase, said second phase having a greater affinity for said required component in order to extract said component from said first phase into said second phase and, after said mixing, subjecting said phases to a settling phase wherein said phases are caused to flow in counter-current fashion with respect to each other in order to separate the phases wherein said settling phase comprises a pre-settling phase, in which there is an initial separation of the phases, and a subsequent main settling in order to complete the separation of the phases.

2. The method according to claim 1, wherein said pre-settling phase is effected in a pre-settling chamber having an inlet for the introduction of said mixed first and second phases and having first and second outlets disposed on opposite sides of said inlet for discharging the first and second phases, respectively, from said first and second outlets.

3. The method according to claim 2, wherein said main settling phase is effected in a main settling chamber, into which said initially separated first and second phases are introduced at opposite sides of said main settling chamber, from said pre-settling chamber outlets.

4. The method according to claim 1, wherein the first phase is an aqueous phase and the second phase is an organic phase.

5. The method according to claim 1, wherein said required component is a metal.

* * * * *